(12) United States Patent
Tanner

(10) Patent No.: US 11,224,204 B2
(45) Date of Patent: Jan. 18, 2022

(54) ANIMAL WASTE COLLECTION AND STORAGE SYSTEM

(71) Applicant: Trae Tanner, Calgary (CA)

(72) Inventor: Trae Tanner, Calgary (CA)

( * ) Notice: Subject to any disclaimer, the term of this patent is extended or adjusted under 35 U.S.C. 154(b) by 386 days.

(21) Appl. No.: 16/281,361

(22) Filed: Feb. 21, 2019

(65) Prior Publication Data

US 2020/0267939 A1 Aug. 27, 2020

(51) Int. Cl.
*A01K 27/00* (2006.01)
*B65D 83/08* (2006.01)

(52) U.S. Cl.
CPC .......... *A01K 27/008* (2013.01); *A01K 27/004* (2013.01); *B65D 83/0805* (2013.01)

(58) Field of Classification Search
CPC .... A01K 27/00; A01K 27/003; A01K 27/004; A01K 27/008
See application file for complete search history.

(56) References Cited

U.S. PATENT DOCUMENTS

| | | | |
|---|---|---|---|
| 7,367,286 B2* | 5/2008 | Beaupre | A01K 27/004 119/795 |
| 8,256,384 B2* | 9/2012 | Wheeler | A01K 27/008 119/795 |
| 8,522,727 B2* | 9/2013 | McBounds | A01K 27/008 119/796 |
| 8,720,385 B2 | 5/2014 | Tanner | |
| 9,232,772 B1* | 1/2016 | Majcen | A01K 5/0114 |
| D762,018 S | 7/2016 | Schmidt | |
| 9,930,868 B2* | 4/2018 | Cox | A01K 27/003 |
| 2003/0154931 A1 | 8/2003 | Ostrowiecki | |
| 2006/0231043 A1 | 10/2006 | Galdo | |
| 2007/0204805 A1 | 9/2007 | Brody | |
| 2008/0276883 A1 | 11/2008 | Perez Tomas | |
| 2010/0300375 A1 | 12/2010 | Yang | |
| 2011/0180016 A1* | 7/2011 | Wheeler | A01K 27/008 119/795 |
| 2012/0137978 A1* | 6/2012 | McBounds | A01K 27/004 119/72 |
| 2014/0131377 A1 | 5/2014 | Rogers | |
| 2016/0219838 A1 | 8/2016 | Flaig | |
| 2020/0060237 A1* | 2/2020 | Prudhomme | A01K 27/004 |
| 2020/0337271 A1* | 10/2020 | Almeida | A01K 27/004 |

FOREIGN PATENT DOCUMENTS

| | | | | |
|---|---|---|---|---|
| CA | 2323174 A1 | 4/2002 | | |
| CA | 2344330 C | 1/2007 | | |
| WO | 2010135821 A1 | 12/2010 | | |
| WO | WO-2018164439 A1 * | 9/2018 | | A01K 27/00 |

* cited by examiner

*Primary Examiner* — Kristen C Hayes
(74) *Attorney, Agent, or Firm* — David Guerra

(57) ABSTRACT

An animal leash system combined with a removable storage container and a bag dispenser. The system includes a housing that encloses a leash retracting mechanism configure to control movement of a leash extending thereout. The bag dispenser is associated with a dispensing section of the housing, and is configured to store at least one bag therein and is configured to allow removal of the bag. The storage container is slidably attachable with a base of the housing between an open position allowing access to an interior of said storage container, and a closed position. The system provides a single unit that includes the advantages of a retractable pet leash with the convenience of having bags ready for use to collect pet waste along with a storage container for disposing of waste filled bags.

13 Claims, 6 Drawing Sheets

ANIMAL WASTE COLLECTION AND STORAGE SYSTEM

BACKGROUND

Technical Field

The present technology relates to an animal waste collection and storage system for use in connection with collecting and storing animal waste. More particularly, it relates to a retractable animal leash device in combination with a bag dispenser and removable storage container.

Background Description

There have long been leashes for controlling and holding pets during walks or for tether pets to an object. Devices for restraining, controlling and limiting the distance a pet or animal can wander from a tethered point or person are well known in the art. Typically these devices are have one a single purpose, that is to restrain or control the animal. One problem associated with such devices is that leashes occupy at least one hand of a user so that other items, which can be useful or necessary to the user, cannot easily be carried. Pet paraphernalia items, such as a ball thrower, waste bag dispenser and/or storage container, may therefore be left behind. Therefore, it is while one is walking a pet that certain items are apt to be most urgently needed and yet not at hand.

Pet owners take their pets out for walks and out to parks. It is common that when out in public, the animal may defecate and it is the accompanying person's responsible to collect and dispose of any excrement. It is further noted that some municipalities have by-laws that require the person accompanying the animal to collect and properly dispose of any excrement. Failure to comply with these by-laws could result in a ticket or fine. Thus, many pet owners are compelled by law and/or a sense of personal responsibility to collect and dispose of waste deposited in public spaces by their pets.

Picking up pet waste is a burdensome and possibly toxic task, where the pet owner must bring a bag along with them and then carry a waste filled bag. The process of collecting pet waste is typically conducted manually, which involves placing a hand inside a bag, using the bag-covered hand to grasp the waste, and rolling the bag over to enclose the waste. After the waste is collected in the bag, the pet owner must then locate an appropriate trash bin for proper disposal of the waste. During this time, the pet owner is required to carry the bag containing the pet waste, in which the bag may rupture thereby leaking pet waste over the pet owner, the pet, the ground or in a vehicle.

Additionally, pet owners like to throw balls for the pet to run after, retrieve, and play with, thereby providing exercise to the pet. Many pet owners like to use retractable leashes to vary the distance the dog can roam depending on their surroundings, and they like to use ball throwers to throw the ball long distances without straining their arms by repeatedly throwing the ball. A retractable pet leash in one hand and a ball thrower in the other results with no free hand, hence the need for a combination pet leash with combined functions.

There are other leash devices designed for tethering pets. While these leash devices may be suitable for the purposes for which they were designed, they would not be as suitable for the purposes of the present technology as heretofore described.

It is thus desirable to provide a device incorporating a retractable leash, a waste bag dispenser, a removable disposable bag storage container, and an attachable ball thrower.

Therefore, a need exists for a new and novel animal waste collection and storage system that can be used for collecting and storing animal waste. In this regard, the present technology substantially fulfills this need. In this respect, the animal waste collection and storage system according to the present technology substantially departs from the conventional concepts and designs of the prior art, and in doing so provides an apparatus primarily developed for the purpose of collecting and storing animal waste.

BRIEF SUMMARY OF THE PRESENT TECHNOLOGY

In view of the foregoing disadvantages inherent in the known types of pet leash systems now present in the prior art, the present technology provides a novel animal waste collection and storage system, and overcomes the above-mentioned disadvantages and drawbacks of the prior art. As such, the general purpose of the present technology, which will be described subsequently in greater detail, is to provide a new and novel animal waste collection and storage system and method which has all the advantages of the prior art mentioned heretofore and many novel features that result in an animal waste collection and storage system which is not anticipated, rendered obvious, suggested, or even implied by the prior art, either alone or in any combination thereof.

According to one aspect of the present technology, the present technology essentially includes a leash system comprising a housing and a storage container. The housing can include a leash retracting mechanism configure to provide a retraction movement of a leash extending out of the housing, and a bag dispensing section. The bag dispensing section can be configured to store at least one bag therein and configured to allow removal of the bag from the bag dispensing section. The storage container can be attachable with the housing between an open position allowing access to an interior of the storage container, and a closed position.

According to another aspect of the present technology, the present technology essentially includes a leash system comprising a housing and a storage container. The housing can include a leash retracting mechanism configure to control movement of a leash extending out of the housing, a base transverse with the housing, and a bag dispensing section associated with the base. The bag dispensing section can be configured to store at least one bag therein and configured to allow removal of the bag from the bag dispensing section. The base can include a wall extending outwardly from the base in a direction opposite the housing. The wall can include a paraphernalia receiving section configured to removably receive and retain a part of a paraphernalia item. The storage container can be slidably attachable with the housing between an open position allowing access to an interior of the storage container, and a closed position.

In some embodiments of the present technology, the housing can include a pair of rails, and the storage container can include a pair of riders configured to slidably engage with the rails, respectively.

In some embodiments, the housing can include a base transverse with the housing, with the bag dispensing section being associated with a first end of the base.

Some embodiments of the present technology can include a door pivotably attached to the base.

In some embodiments, the storage container can include a pair of opposite sidewalls each having a configuration to be flush with an edge of the base when the riders of the storage container are engaged with the rails of the base.

In some embodiments, at least one of the riders can be associated with each of the sidewalls. Each of the riders can define a channel and a guide ledge, and the channel can be configured to slidably receive a flange of the rails, respectively.

In some embodiments, the guide ledge can be interiorly offset in relation to its corresponding sidewalls.

Some embodiments can include the rails associated with opposite edges of the base, respectively.

In some embodiments, the base can have a width greater than a width of the housing.

In some embodiments, the storage container includes a first part of a latch mechanism and the base can include a second part of the latch mechanism. The first part and the second part of the latch mechanism can be engageable with each other when the storage container is in the closed position.

In some embodiments, the storage container can include a pair of retaining sections in a spaced apart relationship configured to receive the bag dispensing section therebetween when the storage container is in the closed position.

Some embodiments can include the retaining sections and the bag dispensing section being removably engageable by way of a post and recess arrangement.

In some embodiments, the housing can include a base with a wall extending outwardly therefrom in a direction opposite the housing. The wall can be configured to be received between the retaining sections when the storage container is in the closed position In some embodiments, the wall can include an object receiving section configured to removably receive and retain a part of a paraphernalia item.

Some embodiments of the present technology can include the object, wherein the paraphernalia item can be a ball thrower, a cane, a tool, an umbrella, a scoop or shovel, a flashlight or an additional pet leash assembly.

In some embodiments, the storage container can include a rear wall featuring an indented region configured to receive at least a portion of the object receiving section of the wall when the storage container is in the closed position.

In some embodiments, the storage container can define a slot configured to receive at least one finger of a hand of a user.

There has thus been outlined, rather broadly, features of the present technology in order that the detailed description thereof that follows may be better understood and in order that the present contribution to the art may be better appreciated.

The present technology may also include (brief description of additional elements and features). There are, of course, additional features of the present technology that will be described hereinafter and which will form the subject matter of the claims attached.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is therefore an object of the present technology to provide a new and novel animal waste collection and storage system that has all of the advantages of the prior art pet leashes and none of the disadvantages.

It is another object of the present technology to provide a new and novel animal waste collection and storage system that may be easily and efficiently manufactured and marketed.

An even further object of the present technology is to provide a new and novel animal waste collection and storage system that has a low cost of manufacture with regard to both materials and labor, and which accordingly is then susceptible of low prices of sale to the consuming public, thereby making such animal waste collection and storage system economically available to the buying public.

Still another object of the present technology is to provide a new animal waste collection and storage system that provides in the apparatuses and methods of the prior art some of the advantages thereof, while simultaneously overcoming some of the disadvantages normally associated therewith.

Even still another object of the present technology is to provide a leash system for dispensing bags, and storing waste filled bags in the storage container. This allows a user of the present technology to collect any pet waste and sanitarily store the waste filled bag for later disposal, without carrying the waste filled bag in the hand or littering the bag.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology.

BRIEF DESCRIPTION OF THE DRAWINGS

The present technology will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENTS

Figure 1:
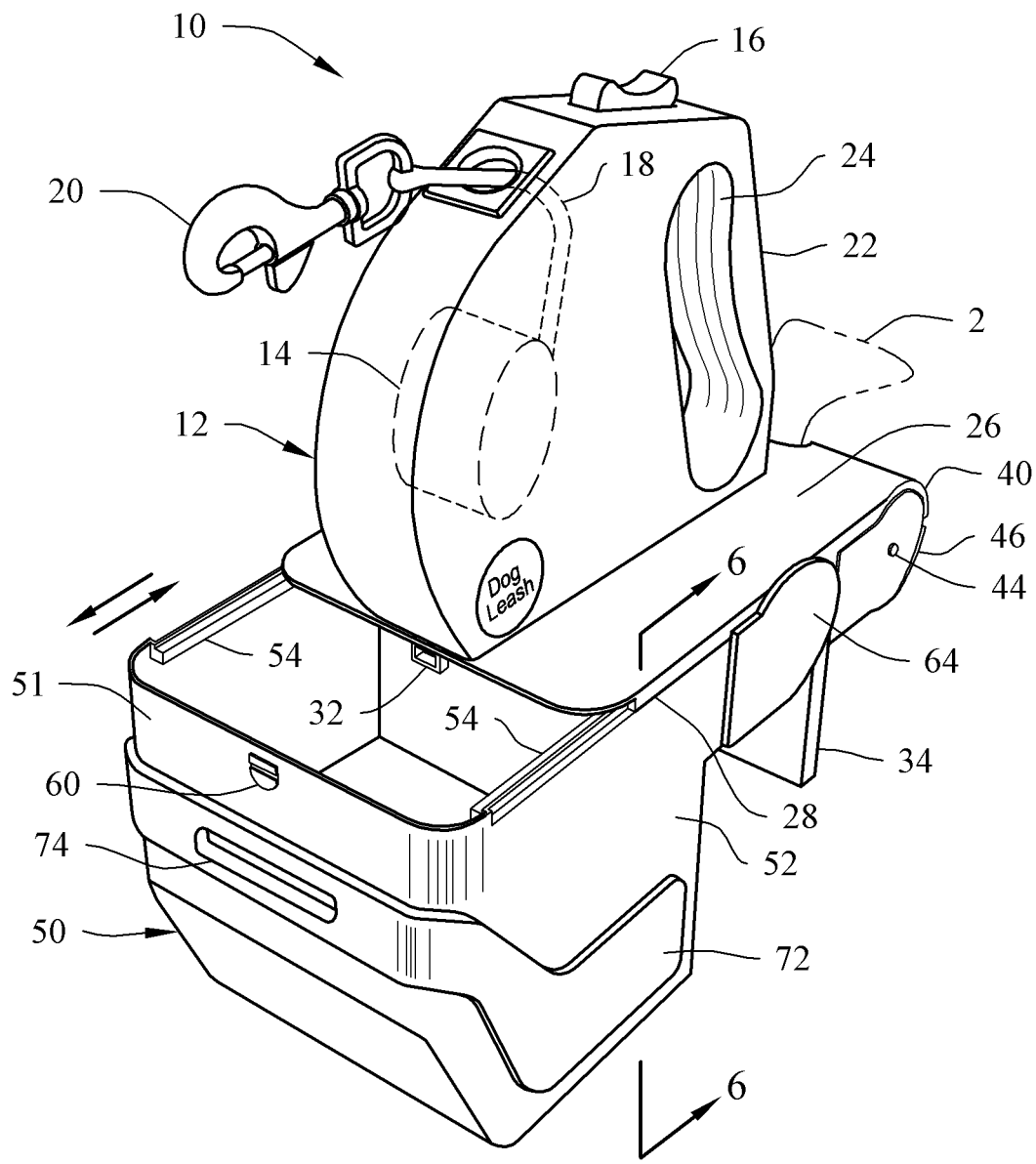
FIG. 1 is a left perspective view of an embodiment of the animal waste collection and storage system constructed in accordance with the principles of the present technology, with the phantom lines depicting environmental structure and forming no part of the claimed present technology.

Referring now to the drawings, and particularly to FIGS. 1-9, an embodiment of the animal waste collection and storage system of the present technology is shown and generally designated by the reference numeral 10.

Figure 2:
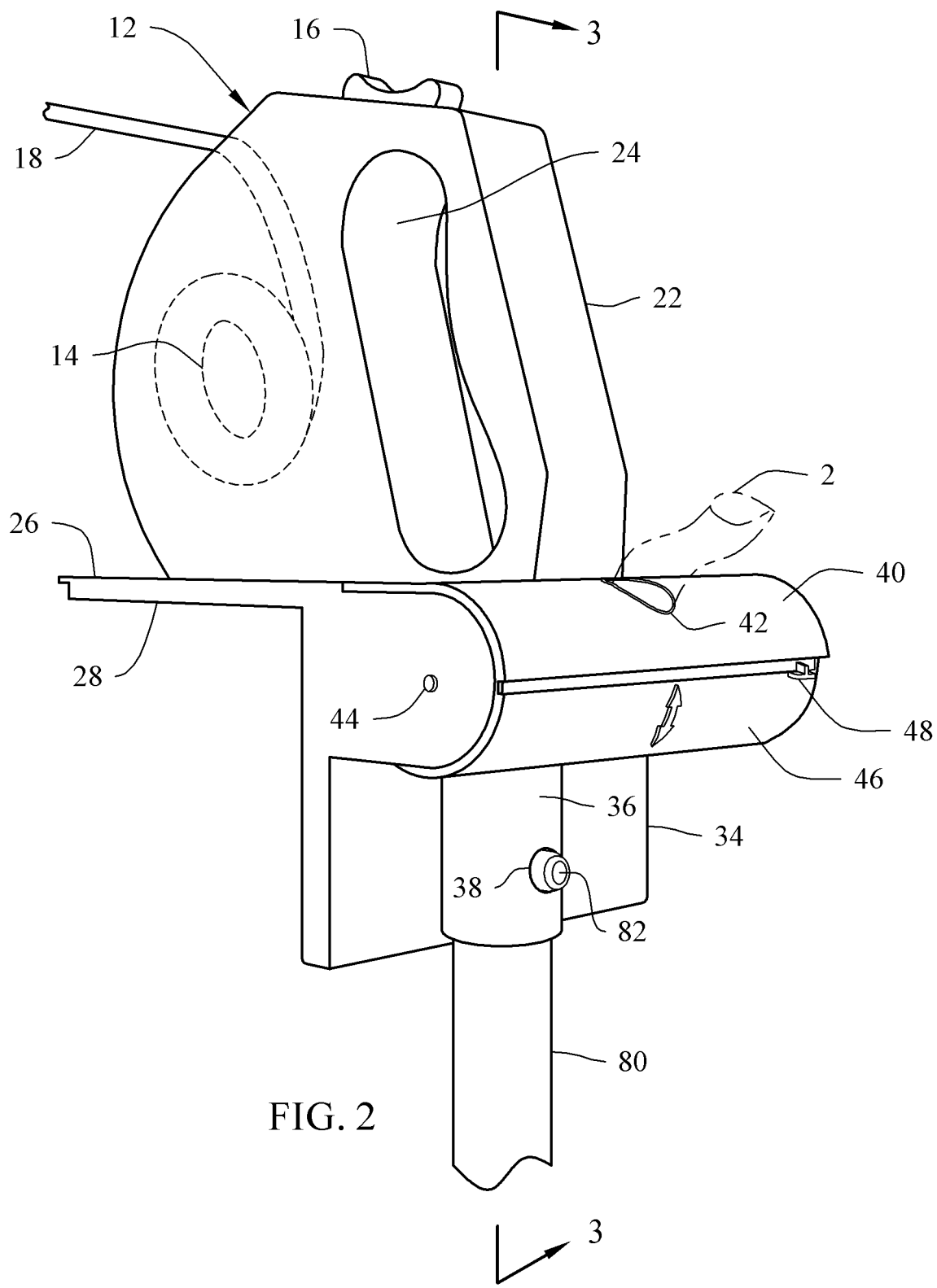
FIG. 2 is a right perspective view of the animal waste collection and storage system of the present technology.
Figure 3:
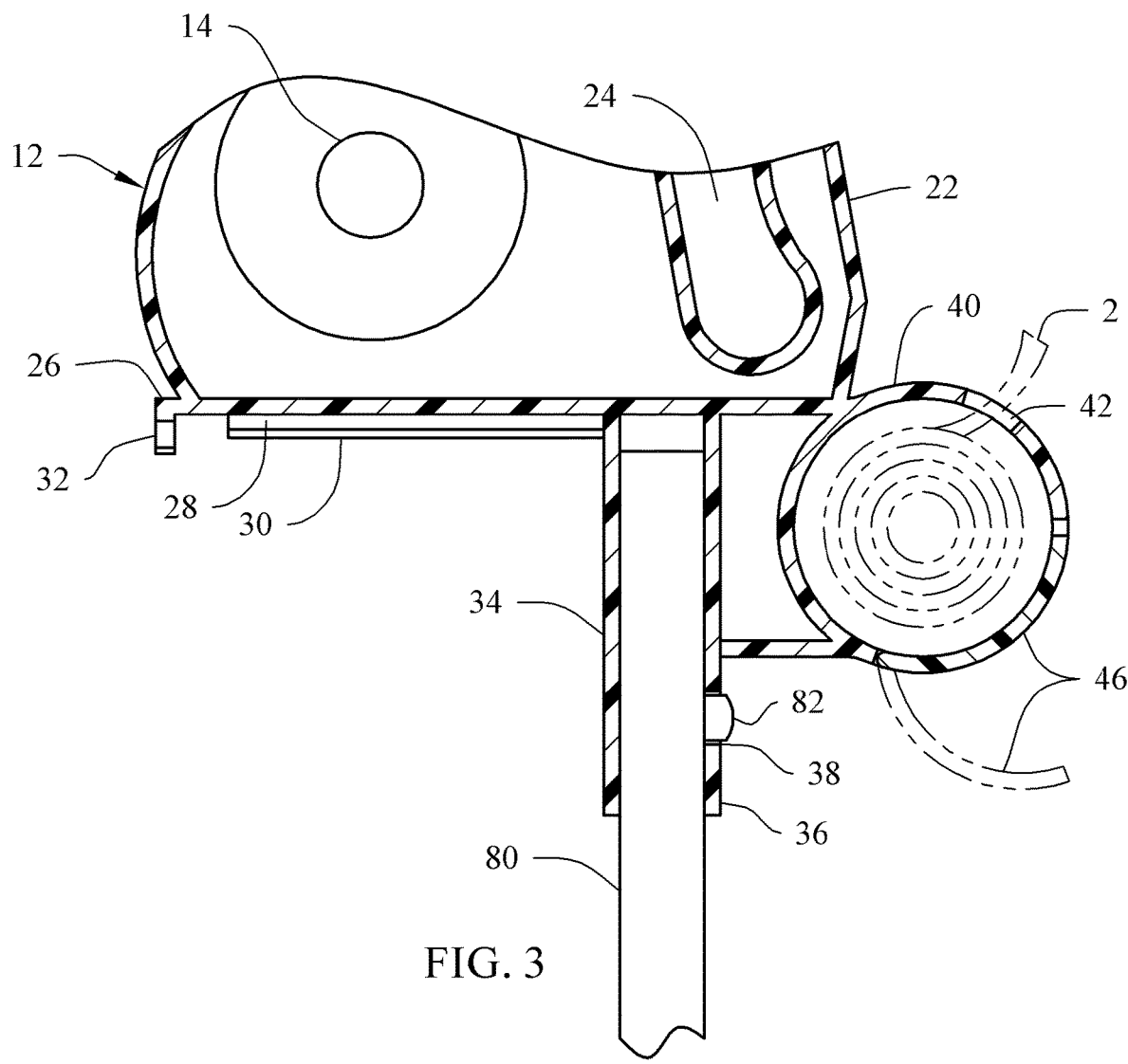
FIG. 3 is a cross-sectional view of the animal waste collection and storage system taken along line 3-3 in FIG. 2.

Referring to FIGS. 1-3, a new and novel animal waste collection and storage system 10 of the present technology for collecting and storing animal waste is illustrated and will be described. More particularly, the animal waste collection and storage system 10 includes a leash housing 12 featuring a bag dispenser or bag dispensing section 40 capable of dispensing a bag 2, a storage container 50 removably attachable to the leash housing 12, and a paraphernalia item 80 removably attachable to the leash housing 12.

The housing 12 has a main body that encloses a leash retracting mechanism 14. A leash activation button 16 is operational through the housing 12 to actuate and control the leash retracting mechanism 14. The housing 12 can be formed from at least two halves joined together to form the housing. The leash retracting mechanism 14 can include, but not limited to, a spring biased ratcheting spool configured to retract a leash, lead or length of cord 18 into the housing 12 and around the spool. When operated by the user, the button 16 prevents the leash retracting mechanism 14 from operating or rotating, and thereby locks the leash retracting mechanism 14 in place. A locking pin can be associated and operably engageable with the button 16, and when activated by the user, locks the button 16 in an operational position, thereby keeping the button 16 engaged with the leash retracting mechanism 14 until the user disengages the locking pin from the button 16. A portion of the button 16 extends out from the housing 12, so as to be operated by the user. The button 16 can include a spring (not shown) so as to force the button to a position that is disengaged from the leash retracting mechanism 14.

In the exemplary, the button 16 can operate a lock-release mechanism that can include includes an element which can be moved up and down. This movement is against the resistance of a spring. The element of the lock-release mechanism can be received in openings, slots or ratchet teeth associated with the leash retracting mechanism 14. While the element is received in one of the ratchet teeth, the leash retracting mechanism 14 is held against rotation.

Releasing pressure on the button 16 or allowing the button to move away from the leash retracting mechanism 14 would result in the element moving out of engagement with the ratchet teeth, thereby allowing the leash retracting mechanism 14 to retract consequently retracting the leash into the housing 12.

It can be appreciated that more than one leash retracting mechanism 14, button 16, and leash 18 can be incorporated into the present technology, thereby allowing the user to walk two or more animals at the same time. It can also be appreciated that a shock absorbing means can be operationally engaged with the leash retracting mechanism 14 or the leash 18, for absorbing a rapid increasing in pulling force or jerk-like force from the animal attached to the leash.

The leash 18 exits the housing 12 through a hole located opposite a handle 22 formed in or attached to the housing 12. It can be appreciated that the hole can have any shape or configuration that allows the leash 18 to pass therethrough. One end of the leash 18 is secured to the spool or the leash retracting mechanism 14 by any suitable means, while the free end is exterior of the housing 12 and includes or is attachable to a clip 20 or a pet collar.

The handle 22 defines an opening 24 configured and ergonomically shaped to receive the users hand and/or fingers therein. The handle 22 and opening 24 may have different shapes and configurations, such as but not limited to, being angled in relation to the longitudinal axis of the housing. Additionally, the handle 22 may include padding or messaging elements to aid the user in grasping the handle 22 or operating the present invention. Furthermore, the handle 22 may include finger receiving recesses and/or have an ergonomic configuration.

Figure 5:
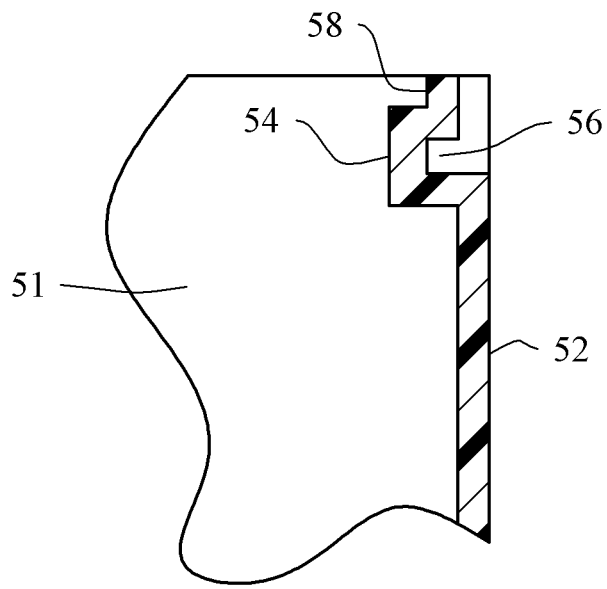
FIG. 5 is a cross-sectional view of the storage container taken along line 5-5 in FIG. 4.

The housing 12 can further include a base 26, traverse with the housing 12. The base 26 can be transverse with a section of the housing 12 that includes the leash retracting mechanism 14 and the handle 22, thereby creating an exposed flat surface. On opposite sides of the base 26, which can be parallel with a longitudinal length of the housing 12, are located slide rails 28. Each slide rail 28 includes a ledge or flange 30, as best illustrated in FIG. 5. The flange 30 of the rails 28 face each other.

Located at a receiving end of the base 26 is a latching or locking tab 32, which can define a recess or hole.

Extending from the base 26, opposite the leash retracting mechanism 14 and the handle 22, is a wall 34. The wall 34 includes a paraphernalia receiving section 36 featuring at least one hole 38. The receiving section 36 can be configured to slidable receive a portion of an attachable paraphernalia item 80, with a biased member or button 82 of the paraphernalia item 80 being receivable through the hole 38 when the paraphernalia item 80 is received in the receiving section 36, as best illustrated in FIGS. 2 and 3. To remove the paraphernalia item 80 from the receiving section 36, the button 82 is depressed thereby allowing the paraphernalia item 80 to freely travel out from the receiving section 36. The paraphernalia item 80 can be, but not limited to, a ball thrower, a cane, a tool, an umbrella, a scoop or shovel, a flashlight, an additional pet leash assembly, or any other device having a member that is receivable in the receiving section 36.

Since the button 16 is located opposite of the paraphernalia item 80, the user will not accidently operate the button 16 and leash retracting mechanism 14 while using the paraphernalia item 80, as best illustrated in FIG. 2. It can be appreciated that multiple paraphernalia items 80 can be interchangeably attached and used with the housing 12.

In this embodiment, the user may optionally use the housing 12 as a standard retractable animal leash without the paraphernalia item 80 attached thereto, thereby providing a more freely maneuverable housing 12 without the paraphernalia item 80 causing any obstruction of use. The user could then attach the paraphernalia item 80 to the housing 12 when the user wants to use the paraphernalia item. This provides the user flexibility in using the present technology, while providing access to waste collection bags and a storage container for storing wasted filled bags.

At a dispensing end of the base 26, which is opposite the receiving end, is a bag dispensing section 40 that can have a configuration corresponding to a roll or stack of bags 2. An opening 42 is defined through the bag dispensing section 40 allowing a bag 2 to be pulled therethrough. The bag dispensing section 40 can include a pair of parallel side sections extending from the base 26 or the wall 34, and a top section that features the opening 42. The side section can feature an arcuate or curved free end with the top section transversely extending between and partially following the side sections. On either side of the bag dispensing section 40 is located a post 44 extending out therefrom.

A flap or door 46 is pivotably attached to the bag dispensing section 40, which provides access to a chamber that is defined interior of the bag dispensing section 40. The door 46 can be pivoted between an open position, allowing access the chamber, and closed position. In the closed position, a gap can be defined between and a distal edge of the door 46 and a distal edge of the bag dispensing section 40. A clasp, lock or door latching member 48 can be associated with the bag dispensing section 40 and the door 46 to retain the door 46 in a closed position until activated by a user to open the door 46.

Alternatively, the door can be omitted with the bag dispensing section 40 being formed by a continuous wall that defines the chamber. In this configuration, an access panel can be removable attached to a side of the bag dispensing section 40. For example, this access panel can be threadably or pivotably attached, and the post 44 can be associated with the access panel.

The chamber is configured to receive the roll or stage of bags 2. Posts or a shaft can be associated with the chamber to rotatably support a roll of bags 2. The roll or stack of bags 2 can include a plurality of separable interconnecting bags that can be pulled through the opening 42 for use.

Figure 4:
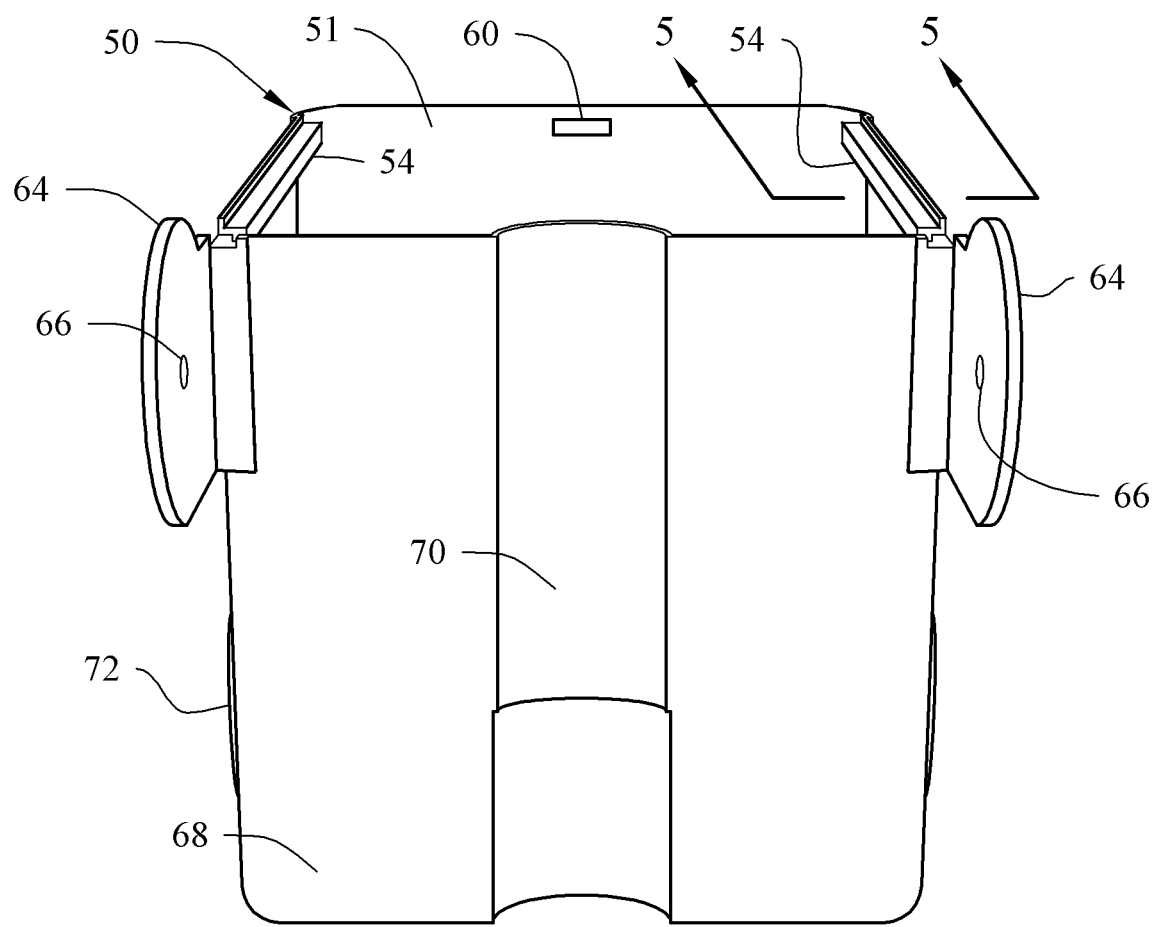
FIG. 4 is a rear perspective view of the storage container of the present technology.

Referring now to FIGS. 1, 4 and 5, the storage container 50 can have a generally open box configuration with a pair of opposite sidewalls 52, a front wall 51, a rear wall 68, and a bottom wall 69. The container 50 can be configured to store items such as, but not limited to, used bags containing waste, balls, toys, personal items, etc. In the exemplary, when user is walking a pet and the pet has defecated. The user could remove one of the bags 2, collect the pet waste in the bag, and place the waste filled bag in the container 50 for later disposal.

Each of the sidewalls 52 can include a track or rider 54 adjacent an edge of its corresponding sidewall. Each rider 54 defines a channel 56 in communication with an interior space of the container 50, and a guide ledge 58, as best illustrated in FIG. 5. The guide ledge 58 can transition to a distal edge of its corresponding sidewall 52, and the guide ledge 58 can be interiorly offset from its corresponding sidewall 52.

Figure 6:
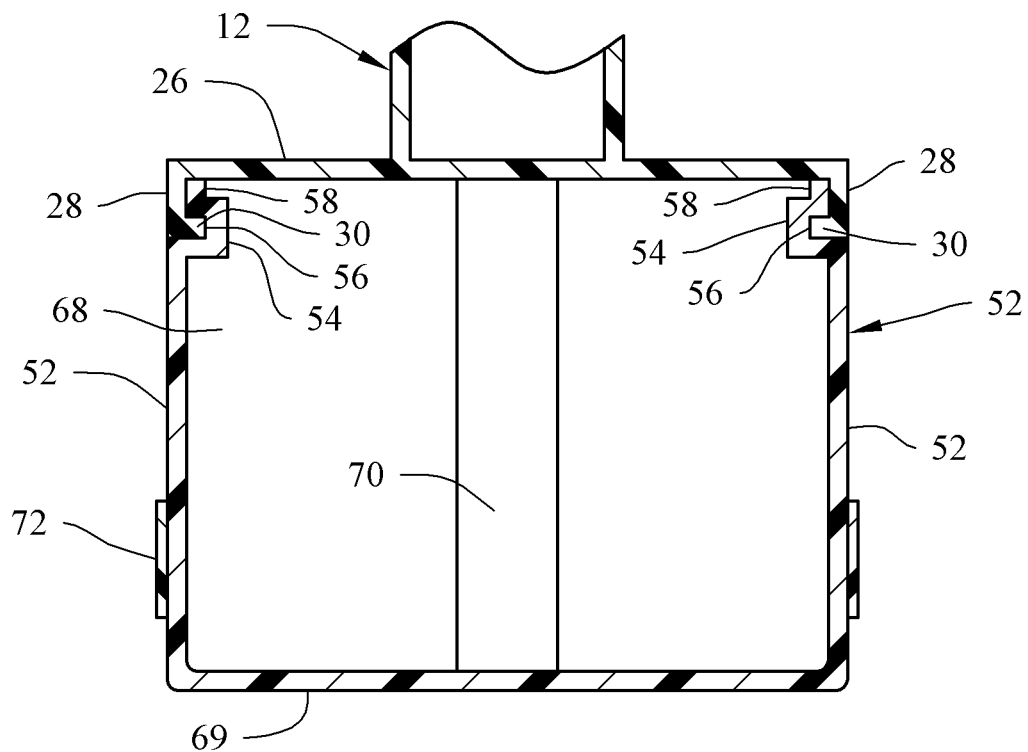
FIG. 6 is a cross-sectional view of the storage container assembled with the leash housing taken along line 6-6 in FIG. 1.

As best illustrated in FIGS. 1 and 4, the channel 56 of each rider 54 can be closed or have a closed end adjacent or near the front wall 51, and can be open or have an open end adjacent or near the rear wall 68. The channel 56 and its open end is configured to slidable receive the flange 30 of a corresponding rail 28, when the container 50 is slidably engaged with the housing 12 so that the rear wall 68 is positioned toward the wall 34. During engagement of the container 50 with the base 26, the guide ledge 58 can laterally receive a web portion of it corresponding rail 28. This arrangement can provide stability and guidance while moving the container 50 along the rails 28, and the flange 30 received in the channels 56 can retain the container 50 in relation to the base 26. The interiorly offset arrangement of the guide ledge 58 can be configured so that an exterior surface of the sidewalls 52 can be flush with an edge of the base 26, as best illustrated in FIG. 6.

Figure 7:
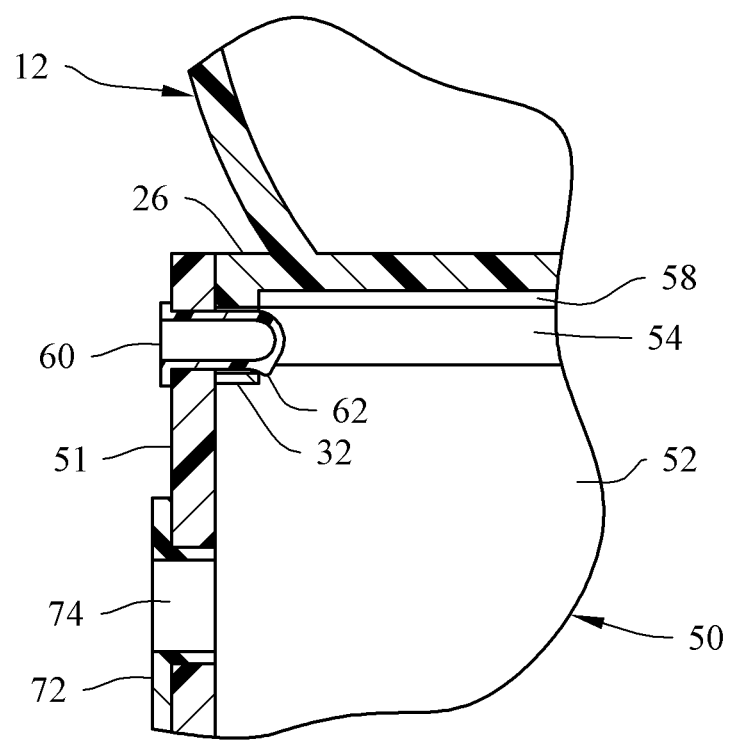
FIG. 7 is a cross-sectional view of the latch assembly of the storage container when engaged with the leash housing.

In the exemplary, a latching or locking member 60 can be associated with, extend from or extend through the front wall 51. The locking member 60 can have a latch 62 that is engageable with the hole of the locking tab 32 when the container is assembled with the housing 12, as best illustrated in FIG. 7. It can be appreciated that other retaining structures or assemblies can be utilized with the present technology to retain the container 50 with the housing 12 untiled removed by the user. Such other assemblies can be, but not limited to, magnets, locks, spring biased members, rotating members, or the like.

Extending or transitioning from the sidewalls 52 or the rear wall 68 is a pair of container retaining sections 64. The retaining sections 64 are spaced apart so as to slide over the sides of the bag dispensing section 40 so that a hole or recess 66 defined in each of the retaining sections 64 can receive one of the posts 44, when the container 50 is assembled with the housing 12.

The rear wall 68 can include an indented region 70 that has a configuration corresponding or capable of receiving the receiving section 36 of the wall 34, as best illustrated in FIG. 4.

A handle member 72 can be attached to, associated with or integral with the front wall 51. The handle member 72 can define a slot 74 configured to allow a user's hand or fingers to be received therein, thereby providing a grip hold to pull, push or manipulate the container 50.

Figure 8:
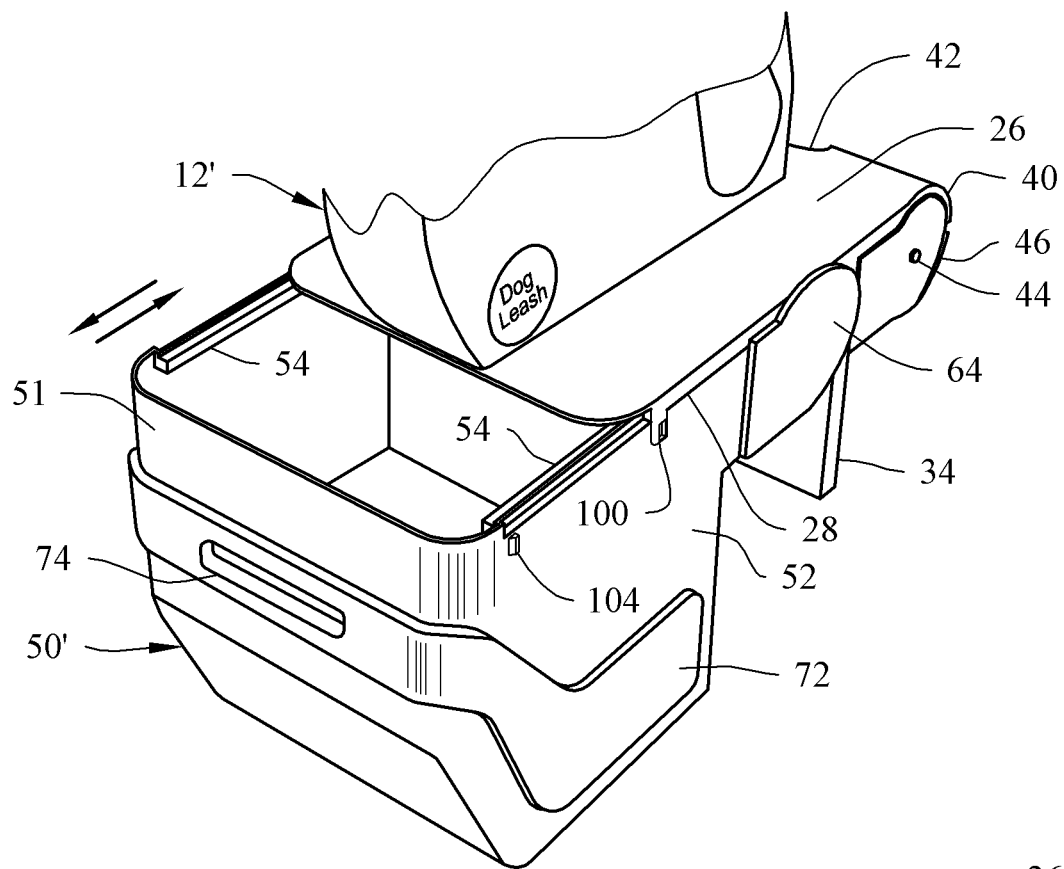
FIG. 8 is a left perspective view of an alternate embodiment of the animal waste collection and storage system constructed in accordance with the principles of the present technology.
Figure 9:
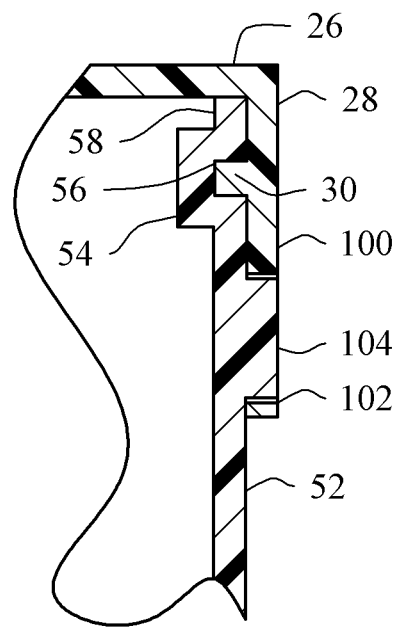
FIG. 9 is a cross-sectional view of the latch assembly of the alternate storage container when engaged with the alternate leash housing.

Referring to FIGS. 8 and 9, an alternate embodiment housing 12' and container 50' is illustrated and described herewith. The housing 12' omits the locking tab from the front edge of the base 26, and in place provides a side locking tab 100 located on either side of the base 26 adjacent an end of the rails 28 near the front edge of the base 26. Each side locking tab 100 defines a recess or locking hole 102. The side locking tabs 100 are spaced apart to receiving therebetween the edges of the sidewalls 52 containing the riders 54.

The container 50' omits the locking member from the front wall 51, and in place provides side locking members 104 on each of the sidewalls 52. Each side locking member 104 is configured to be received in a corresponding locking hole 102 when the container 50' is assembled with the housing 12', thereby retaining the container 50' with the housing 12' until removed by the user. The side locking members 104 can include a ramp surface allowing for smooth travel against an interior side of its corresponding side locking member 104 until aligned with the locking hole 102.

It can be appreciated that the housing and storage container can be made of, but not limited to, plastics, metals, alloys, or composites. Furthermore, the housing, the base and the bag dispensing section can be integrally formed as a single unit.

In use, it can now be understood that a user could attach the clip 20 or the leash 18 to an animal collar or harness, and then take the animal for a walk. The user could operate the leash activation button 16 of the housing 12, 12' to control the retracting mechanism 14 to advance, lock or retract the leash 18. To manipulate the housing, the user could grasp the handle 22 with one hand thereby leaving the other hand free for use.

If the animal defecates, the user could remove one of the bags 2 from the opening 42, and collect the animal waste inside the bag 2. The user could then tie the bag 2 closed. The storage container 50, 50' can be opened by sliding the storage container away from the wall 34, thereby providing access to the interior of the storage container. The user could place the closed wasted filled bag into the storage container, and then close the storage container by sliding it toward the wall 34 until the recess 66 are located over their corresponding posts 44 and received therein. In this position, the side locking member 60, 104 is engaged with the locking tab 32, 100, which further retains the storage container in this closed position.

In addition or alternately, the user could store items for use in the storage container, and the access these items by sliding the storage container open.

To replenish the bags, the user could operate the door latching member 48 and then pivot the door 46 to the open position. A new roll or stack of bags can then be inserted into the chamber of the bag dispensing section 60. The door 46 can then be pivoted closed for retaining the bags in the chamber.

Further in the alternative, a paraphernalia item 80 can be attached to and utilized with the housing by inserted a portion of the paraphernalia item into the paraphernalia receiving section 36 of the housing. In the exemplary, the paraphernalia item 80 could be a ball thrower with an end of the ball thrower inserted into the receiving section 36 until a biased member 82 is received in or engaged with the hole 38. The user could invert the housing so that the ball thrower is orientated in an operable position, and grasp the handle 22 to operate the ball thrower. It can be appreciated that usage of the ball thrower can be accomplished with the storage container assembled with the housing.

It can be appreciated that the paraphernalia item 80 can be joined with the paraphernalia receiving section 36 by means different to that illustrated and described herewith. Such joining arrangements can utilize, but not limited to, threading, latches, a biased member, a slot and key, a magnet or any other mechanical separate connection.

The ball thrower can include a shaft with an end of which can be received and retained in the paraphernalia receiving section. The shaft can include a ball receiving end located at a free distal end of the shaft, and defines a ball receiving opening configured to receive a ball therein. The shaft can be made of a material having sufficient shape memory and flexibility so as to allow the shaft to flex and force the ball out of the ball receiving element, and then return to its previous shape and position.

While embodiments of the animal waste collection and storage system have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although collecting and storing animal waste have been described, it should be appreciated that the system of the present technology herein described is also suitable for storing usable items with a pet leash and/or utilizing objects with a pet leash.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A leash system comprising:
    a housing including a bag dispensing section, a pair of rails, a base transverse with said housing, and a leash retracting mechanism configure to provide a retraction movement of a leash extending out of said housing, said bag dispensing section being configured to store at least one bag therein and configured to allow removal of the bag from said bag dispensing section, said bag dispensing section being associated with a first end of said base, wherein said bag dispensing section includes a door pivotably associated with said base; and
    a storage container attachable with said housing between an open position allowing access to an interior of said storage container, and a closed position, said storage container including a pair of riders configured to slidably engage with said rails.

2. The leash system as claimed in claim 1, wherein said storage container includes a pair of opposite sidewalls each having a configuration flush with an edge of said base when said riders of said storage container are engaged with said rails of said base.

3. The leash system as claimed in claim 2, wherein at least one of said riders being associated with each of said sidewalls, each of said riders defines a channel and a guide ledge, said channel being configured to slidably receive a flange of said rails, respectively.

4. The leash system as claimed in claim 3, wherein said guide ledge being interiorly offset in relation to its corresponding said sidewalls.

5. The leash system as claimed in claim 1, wherein said rails are associated with opposite edges of said base, respectively.

6. The leash system as claimed in claim 1, wherein said base has a width greater than a width of said housing.

7. The leash system as claimed in claim 1, wherein said storage container includes a first part of a latch mechanism and said base includes a second part of said latch mechanism, with said first part and said second part of said latch mechanism being engageable with each other when said storage container is in the closed position.

8. The leash system as claimed in claim 1, wherein said storage container includes a pair of retaining sections in a spaced apart relationship configured to receive said bag dispensing section therebetween when said storage container is in the closed position.

9. The leash system as claimed in claim 8, wherein said retaining sections and said bag dispensing section being removably engageable by way of a post and recess arrangement.

10. The leash system as claimed in claim 8, wherein said housing includes a base with a wall extending outwardly therefrom in a direction opposite said housing, said wall being configured to be received between said retaining sections when said storage container is in the closed position.

11. The leash system as claimed in claim 10, wherein said wall includes a paraphernalia receiving section configured to removably receive and retain a part of a paraphernalia item.

12. The leash system as claimed in claim 11, wherein said storage container includes a rear wall featuring an indented region configured to receive at least a portion of said paraphernalia receiving section of said wall when said storage container is in the closed position.

13. The leash system as claimed in claim 1, wherein said storage container defines a slot configured to receive at least one finger of a hand of a user.

* * * * *